United States Patent [19]

Bussiere et al.

[11] Patent Number: 5,603,980
[45] Date of Patent: Feb. 18, 1997

[54] HETEROGENEOUS COMPOSITION FOR FEEDING ANIMALS

[75] Inventors: Michel Bussiere, Salouel, France; Gaston Fournet, Blonay, Switzerland; Pascal Vanacker, Villers Bretonneux, France

[73] Assignee: Nestec S.A., Vevey, Switzerland

[21] Appl. No.: 265,436

[22] Filed: Jun. 24, 1994

[30] Foreign Application Priority Data

Jul. 3, 1993 [EP] European Pat. Off. .............. 93110636

[51] Int. Cl.⁶ .................. A23K 1/00; A23K 1/10; A23L 1/05; A23L 1/052

[52] U.S. Cl. .................. 426/641; 426/573; 426/574; 426/575; 426/643; 426/645; 426/646; 426/647; 426/635; 426/805; 426/92

[58] Field of Search .................. 426/641, 643, 426/574, 573, 575, 645, 646, 647, 635, 805, 92

[56] References Cited

U.S. PATENT DOCUMENTS

| 4,427,704 | 1/1984 | Cheney et al. |  |
|---|---|---|---|
| 4,678,676 | 7/1987 | Ishizuka et al. | 426/573 |
| 4,746,528 | 5/1988 | Prest et al. |  |
| 4,851,394 | 7/1989 | Kubodera | 514/54 |

FOREIGN PATENT DOCUMENTS

| 3714361 | 11/1988 | Germany. |
| 1537209 | 12/1978 | United Kingdom. |
| 2219803 | 12/1989 | United Kingdom. |

OTHER PUBLICATIONS

Derwent Publications Abstract No. C88–143148 of German Patent Application No. DE 3714261A1 (1988).

*Primary Examiner*—Esther Kepplinger
*Assistant Examiner*—Choon P. Koh
*Attorney, Agent, or Firm*—Vogt & O'Donnell, LLP

[57] ABSTRACT

From 2% to 15% by weight of solid pieces of a gel having a water content of above 95% and a size of from 2 mm to 10 mm are mixed with a meat base or fish base to obtain a heterogeneous composition which has a water content of at least 82% by weight. The gel is prepared with K-carragheenin or gellane.

23 Claims, No Drawings

HETEROGENEOUS COMPOSITION FOR FEEDING ANIMALS

BACKGROUND OF THE INVENTION

This invention relates to a heterogeneous meat- or fish-based composition for feeding animals.

At present, known compositions for feeding animals generally have a water content below 82%. There is currently a trend towards increasing the water content of tinned food compositions for domestic animals, such as cats and dogs. If the water content is merely increased, a commercially unsatisfactory watery product is obtained. To overcome this disadvantage, the content of gelling agents may be increased. Unfortunately, this has an adverse effect on the texture of the end product obtained and increases its price.

SUMMARY OF THE INVENTION

The problem addressed by the present invention was to provide a heterogeneous composition for feeding domestic animals which would give a product of satisfactory appearance with a compatible texture for the field in question and which would enable the water content to be imperceptibly increased.

The heterogeneous composition according to the present invention has a water content of at least 82% by weight and contains a meat base or fish base and contains from 2 to 15% of solid pieces from 2 to 10 mm in size with a water content above 95% containing at least one gelling agent.

The present invention also provides a process for the production of the composition described above, wherein water is mixed with a gelling agent at a temperature of 15° to 95° C. and the resulting mixture is treated for 5 to 15 minutes at a temperature in the range from 25° to 95° C. and then cooled to a temperature of 4° to 25° C., the gel obtained is cut into pieces, the pieces are mixed with a meat or fish base and the whole is sterilized.

DETAILED DESCRIPTION OF THE INVENTION

All the percentages mentioned in the present specification are percentages by weight. In the context of the invention, meat bases are understood to be ground meats or microground meats (mousses) or the same meats to which natural or reconstituted pieces have been added (terrines). The same definition applies to fish bases. Meat is under-stood to be meat from poultry, rabbits, cattle or sheep, offal or ground carcasses. Offal is understood to be both the lobes of lungs and also liver or kidney.

The solid pieces are uniformly distributed through-out the meat or fish base. It has been found that the size of the solid pieces should be between 2 and 10 mm. Beyond 10 mm, the composition assumes an unsatisfactory appearance.

In one particular embodiment, the composition according to the invention contains approximately 10% of solid pieces and has a water content of 82 to 85%.

The solid pieces have a water content above 97%, the remainder consisting of a gelling agent selected from K-carragheenin or gellane on its own, K-carragheenin in admixture with a galactomannan, gellane and an alginate.

The object is to obtain a gel firm enough for cutting. The galactomannan is selected from tara gum, carob and cassia flour.

The composition according to the invention is normally sterilized.

The gelling agent is selected on the one hand to obtain a rapid preparation for its hydration (i.e., of the order of 10 minutes at 90° to 95° C.) and, on the other hand, to obtain a high gel strength and, finally, to ensure that the gel shows high stability to sterilization in the terrine or in a mousse because it is generally not thermo-irreversible.

The gelling agents mentioned above, which enable the three requirements just mentioned to be satisfied, are used in the process according to the invention.

The gelling agent is mixed with water in a quantity of 0.25 to 3% by weight and preferably in a quantity of 0.5 to 2% by weight.

For certain gelling agents, mineral salts, for example KCl and $CaCl_2$, have to be added for gelation to take place. In other words, KCl is added in the case of K-carragheenin while $CaCl_2$ is added in the case of gellane.

The mixture of water and gelling agent is normally treated for 10 minutes at 95° C. and then cooled to between 4° and 25° C. over a period of 1.5 to 4 hours.

The composition is then cut into cubes in a known unit, for example in an Urschel cubing machine, so that cubes from 2 to 10 mm in size are obtained.

It is through the content of solid pieces of 5 to 15% that the gel best withstands subsequent sterilization. In this case, 85 to 95% of meat or fish base is mixed with the 5 to 15% of the solid pieces.

The meat or fish base normally has a moisture content of 70 to 80%.

Sterilization is carried out conventionally. At a temperature in the range of 110° to 140° C. including over a period of 10 to 55 minutes at a temperature in the range from 120° to 135° C.

The process according to the invention is carried out discontinuously.

EXAMPLES

The invention is illustrated by the following Examples.

Examples 1 to 5

Gelling agents used

EX. 1 1.5% of refined K-carragheenin

EX. 2 2% of semi-refined K-carragheenin

EX. 3 1.6% semi-refined K-carragheenin 0.4% of tara gum

EX. 4 1.6% of semi-refined K-carragheenin 0.4% of carob-bean flour

Ex. 5 0.5% of gellane

In the first four Examples, the gelling agent is dispersed in cold water and then heated for 10 minutes to 95° C. in the presence of 0.1 to 0.3% of KCl. In Example 5, the gellane is incorporated at elevated temperature (95° C.) along with 0.2% of $CaCl_2$, the temperature of 95° C. being maintained for about 10 minutes.

The gel is then cooled to 12° C. over a period of 30 minutes and cubed to form pieces approximately 5 mm in size.

10% of pieces are mixed with a meat base (90%) of liver and lung and the whole is sterilized for 5 minutes at 140° C.

The end product has a water content of 83.5%, a good texture and was readily accepted by the cats to which it was offered.

Example 6

Gellane is dispersed in cold water (0.5%) containing 0.1% of sodium citrate. The mixture is heated for 10 minutes to 95° C. A calcium salt (CaCl$_2$, 0.1% to 0.25%) is then added at that temperature. When the salt has dissolved, the solution is cooled under the same conditions as in Examples 1 to 5.

The gel cooled under these conditions is incorporated in a meat base as in the previous Examples.

We claim:

1. A heterogeneous meat-based or fish-based composition comprising (i) from 5% to 15% by weight solid pieces of a gel comprising K-carragheenin or gellane or admixture thereof and having a water content of above 95% by weight and a size of from 2 mm to 10 mm and (ii) a meat base or a fish base, the solid pieces and the base being in amounts so that the composition has a water content of at least 82% by weight.

2. A composition according to claim 1 wherein the solid pieces have a water content of above 97% by weight.

3. A composition according to claim 1 or 2 wherein the composition has a water content of from 82% to 85% by weight.

4. A composition according to claim 1 wherein the base has a water content of from 70% to 80% by weight.

5. A composition according to claim 3 wherein the base has a water content of from 70% to 80% by weight.

6. A composition according to claim 1 or 2 wherein the composition is a sterilized composition.

7. A composition according to claim 3 wherein the composition is a sterilized composition.

8. A composition according to claim 1 wherein the gel comprises K-carragheenin and further comprises a substance selected from the group consisting of galactomannans and alginates.

9. A composition according to claim 8 wherein the galactomannans are selected from the group consisting of tara gum, carob bean flour and cassia flour.

10. A composition according to claim 1 wherein the base is in an amount of from 85% to 95% by weight.

11. A composition according to claim 1 wherein the base is in a form of a mousse.

12. A composition according to claim 1 wherein the base is in a form of a terrine.

13. A process for preparing a heterogeneous meat-based or fish-based composition comprising:

mixing, at a temperature of from 15° C. to 95° C., K-carragheenin or gellane or admixture thereof with a mineral salt and water in an amount sufficient to obtain a mixture having a water content of above 95% and treating the mixture at a temperature of from 25° C. to 95° C. for from 5 minutes to 15 minutes and then cooling the treated mixture to a temperature of from 4° C. to 25° C. to obtain a gel;

cutting the gel into pieces;

mixing the gel pieces with a meat base or a fish base to obtain a heterogeneous base and gel composition having a water content of at least 82% by weight; and sterilizing the heterogeneous composition.

14. A process according to claim 13 wherein the gel pieces are mixed with the base so that the composition contains the gel pieces in an amount from 5% to 15% by weight.

15. A process according to claim 13 or 14 wherein the gel pieces and the base are mixed so that the heterogeneous composition has a water content of from 82% to 85% by weight.

16. A process according to claim 13 or 14 wherein the base has a water content of from 70% to 80% by weight.

17. A process according to claim 15 wherein the base has a water content of from 70% to 80% by weight.

18. A process according to claim 13 wherein the K-carragheenin or the gellane or the admixture thereof is mixed with the water and salt in an amount of from 0.25% to 3% by weight.

19. A process according to claim 13 wherein K-carragheenin is mixed with the salt and water and further comprising mixing a substance selected from the group consisting of galactomannans and alginates with the K-carragheenin, salt and water.

20. A process according to claim 19 wherein the galactomannans are selected from the group consisting of tara gum, carob bean flour and cassia flour.

21. A process according to claim 13 wherein the mineral salt is selected from the group consisting of KCl and CaCl$_2$.

22. A process according to claim 13 wherein the gel pieces are cubes and have a size of from 2 mm to 10 mm.

23. A process according to claim 13 wherein the heterogeneous composition is sterilized at a temperature of from 110° C. to 140° C.

* * * * *

UNITED STATES PATENT AND TRADEMARK OFFICE
CERTIFICATE OF CORRECTION

PATENT NO.  : 5,603,980
DATED       : February 18, 1997
INVENTOR(S) : Michel BUSSIERE, et al.

It is certified that error appears in the above-indentified patent and that said Letters Patent is hereby corrected as shown below:

Column 1, line 56, after the period, insert --A known unit may be used to cut the gel into cubes.--.

Signed and Sealed this

Twenty-second Day of July, 1997

Attest:

BRUCE LEHMAN

*Attesting Officer*     *Commissioner of Patents and Trademarks*